United States Patent [19]

Feinbloom

[11] 3,947,139
[45] Mar. 30, 1976

[54] LIGHT SOURCES EMPLOYING UNIVERSALLY ADJUSTABLE BALL AND SOCKET JOINTS

[75] Inventor: Richard E. Feinbloom, New York, N.Y.

[73] Assignee: Designs For Vision, Inc., New York, N.Y.

[22] Filed: Mar. 25, 1975

[21] Appl. No.: 561,857

Related U.S. Application Data

[62] Division of Ser. No. 462,616, April 22, 1974.

[52] U.S. Cl. .................................. 403/90; 403/143
[51] Int. Cl.² ........................................ F16C 11/06
[58] Field of Search ............ 403/90, 143, 136, 135, 403/122, 124, 125, 144, 76, 77, 137, 138, 141, 142, 115, 131; 285/DIG. 8

[56] References Cited
UNITED STATES PATENTS

| | | | |
|---|---|---|---|
| 1,551,323 | 8/1925 | Offerdahl | 403/115 |
| 3,186,736 | 6/1965 | Warshawsky | 285/DIG. 8 |
| 3,787,128 | 1/1974 | Maistrelli | 403/135 |

FOREIGN PATENTS OR APPLICATIONS

| | | | |
|---|---|---|---|
| 211,991 | 3/1924 | United Kingdom | 403/90 |
| 532,921 | 11/1956 | Canada | 403/122 |

*Primary Examiner*—Andrew V. Kundrat
*Attorney, Agent, or Firm*—Arthur L. Plevy

[57] ABSTRACT

There is disclosed a light assembly or similar apparatus which is adjustable by means of a ball and socket assembly incorporating an elastomeric "O" ring which abuts against the periphery of the ball when a ball accommodating sectionalized socket assembly is clamped together.

3 Claims, 6 Drawing Figures

U.S. Patent   March 30, 1976   3,947,139
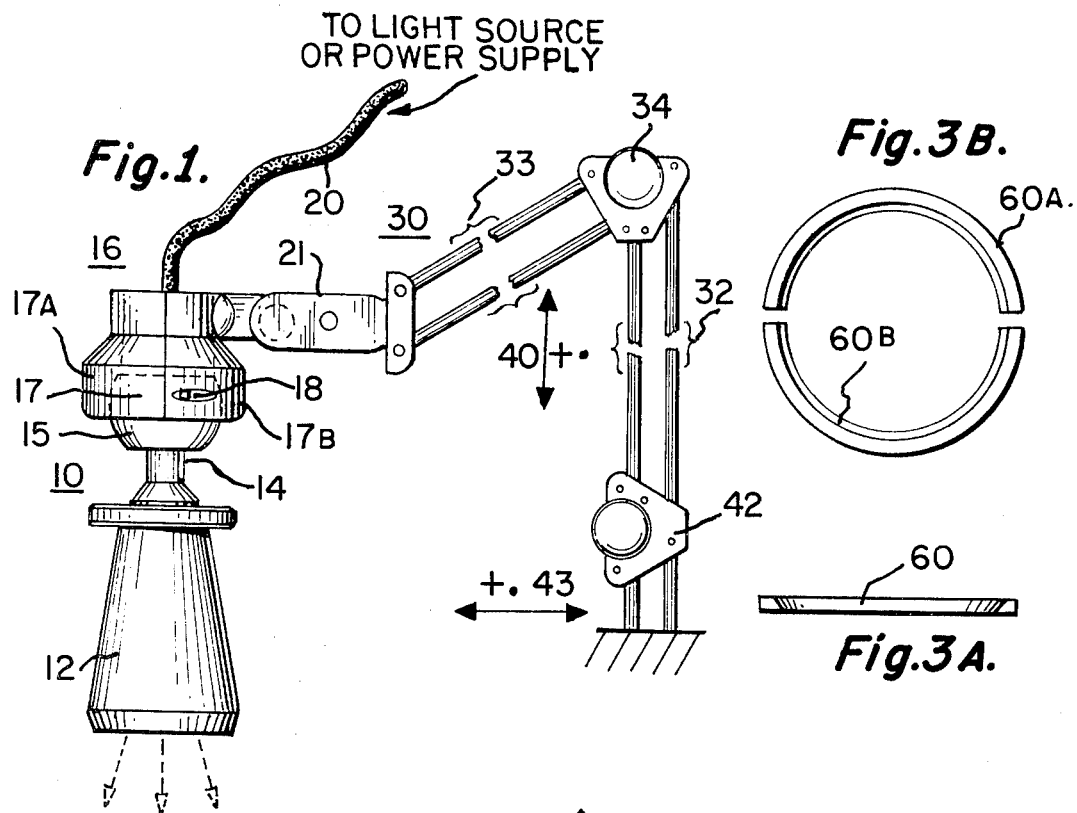
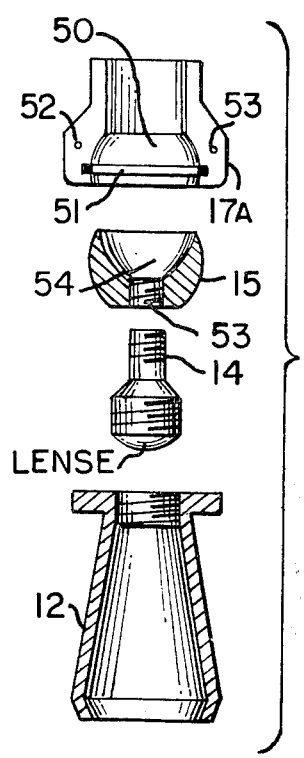
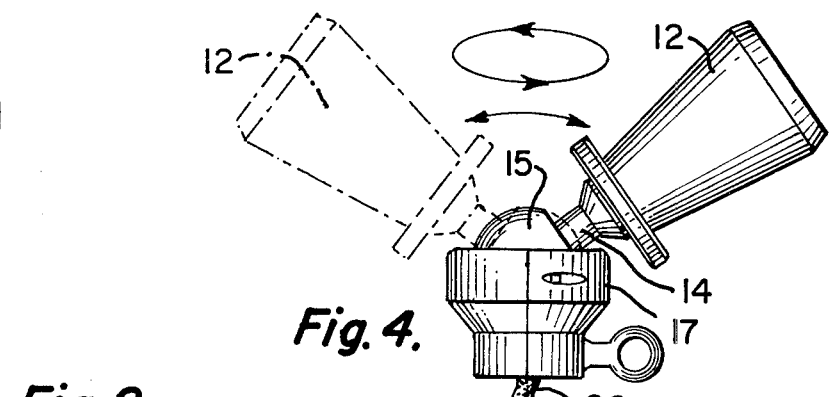
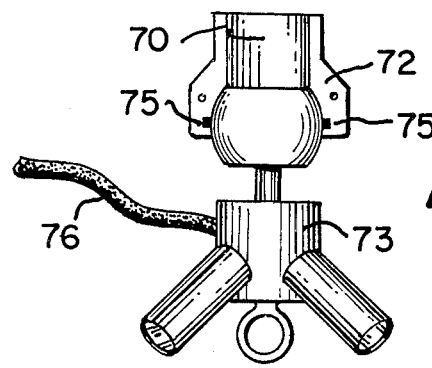

LIGHT SOURCES EMPLOYING UNIVERSALLY ADJUSTABLE BALL AND SOCKET JOINTS

This is a divisional of application Ser. No. 462,616, filed on Apr. 22, 1974.

BACKGROUND OF INVENTION

Lighting fixtures and light sources are an integral part of modern day surgical techniques. As physicians and surgeons develop new surgical techniques, the need increases for more reliable and efficient optical aids. Thus, the field of optical aids and equipment has also been associated with rapid strides and progress in order to supply the lighting required by the significant advances made in the medical and related fields.

Coupled with the desire to provide better illumination while reducing glare and improving efficiency, is the need for a light source which can be easily and conveniently adjusted either prior to or during the surgical technique.

The surgeon desires to adjust the light source in a given direction and position and must be assured that it will be maintained in that position during the surgical procedure.

As one can easily envision, the prior art is replete with a number of references that are directed toward the problem of adjusting a source of light and maintaining the same in a predetermined and desired position.

To facilitate solution of this problem, certain of the prior art devices employ the conventional ball and socket joint with various modifications to insure greater capability of adjustment. While a "ball and socket joint" is a well-known and conventional means for providing adjustability, it suffers from many disadvantages.

First, the problem of maintaining the apparatus in a given position is considerable; as due to the nature of the joint it is capable of easy positioning and once utilized for an extended time becomes loose fitting and can move due to extremely small spurious forces. Also depending upon the weight of the apparatus to be positioned, the forces thus exerted on the assembly may cause one to experience difficulty in accurately positioning the same caused by slippage or inertia due to the weight. Such mechanical drifts would be extremely detrimental and disturbing to a physician or surgeon during an operating procedure and, in general, would be disturbing to any user desiring to maintain an accurate, predetermined positioned assembly, be it a light source or any other device whose adjusted position is to be accurately maintained once aligned properly.

BRIEF DESCRIPTION OF PREFERRED EMBODIMENT

A ball and socket joint associated with a optical assembly comprises a hollow socket having an internal groove or channel about the inner periphery thereof, said hollow accommodating a ball section with friction means accommodated in said channel for frictionally engaging the peripheral surface of said ball when accommodated by said socket to maintain said ball in any one of a plurality of positions of adjustment, said frictional means including a beveled "O" ring seated and positioned in said channel socket.

BRIEF DESCRIPTION OF FIGURES

FIG. 1 is a side elevational view of an auxillary lamp apparatus according to the invention.

FIG. 2 is a partial cross sectional view of the ball and socket apparatus according to the invention.

FIGS. 3A and 3B are respectively a side view of a hemispherical "O" ring section and a top view showing the two "O" sections.

FIG. 4 is a front perspective view depicting certain adjustable aspects of the apparatus.

FIG. 5 is a partial cross sectional front view of an alternate use of the apparatus.

DETAILED DESCRIPTION OF FIGURES

Before describing the invention in detail one should be aware that the ball and socket joint to be depicted has wide-spread applicability as a positional apparatus and may be used to support and position surgical microscopes, all types of other lighting arrangements as well as additional apparatus. In any event, the specification will concentrate on an auxillary lighting source used primarily for surgical procedures, understanding that a plethora of additional apparatus could be accommodated as well.

Referring to FIG. 1, there is shown a perspective side elevational view of a lighting apparatus 10 including a ball and socket joint assembly according to this invention.

A conical shaped front assembly 12 is utilized to permit sterilization of the section and the assembly 12 acts as a means for adjusting the light source under sterile conditions. The surgeon adjusts the light by grasping the sterile conical section 12 and hence he does not become contaminated while affording adjustment. The section 12 is fabricated from aluminum or other metal capable of being sterilized prior to surgical procedure. As such, the cone 12 is removably secured to a shaft 14 which is fixed or rigidly secured to the ball section 15 of a ball and socket assembly 16. The socket assembly 17 surrounds the ball 15 and permits rotational movement of the same and hence of the shaft 14 secured to the ball 15 and therefore of the light emitting conical section 12.

The socket portion 17 is split into a first and second section 17A and 17B which are held together by means of set screws as 18, which, as will be explained, can be tightened to set the assembly at a fixed position or loosened to provide adjustability. Once the set screws are tightened constant tension is exerted on the ball allowing the user to adjust the apparatus at any time without having to loosen or tighten any position fixing nuts and screws.

A cable 20, which may be a fiber optic assembly or a power cable is coupled to a lens assembly or a lamp source which, as will be shown, can be positioned in or mounted within the shaft 14 or ball assembly 15 of the assembly 10. The shaft 14 actually contains te optical system and together with the lens controls the light pattern. The socket 17 may have an additional coupling member 21 secured thereto to enable the entire assembly to be coupled to or fastened to additional adjustment means for providing complete horizontal and vertical movement.

Thus shown in FIG. 1, is an adjustable bracket arrangement 30, consisting of a vertical support member 32 and a horizontal support member 33. The vertical and horizontal members are attached to each other via a hinged joint 34, which may also be a ball and socket assembly or a hinged assembly affording the motion shown by the arrow 40. The horizontal member 33, in a similar manner, may be associated with an additional hinge 42 to permit motion in the direction shown by arrows 43. Thus, as one can see, the entire assembly can move in all planes and at all angles at distances determined by the length of the assemblies 32 and 33. The conical front section 12 can also be independently adjusted by means of the ball and socket assembly 16 to be described.

Referring to FIG. 2, there is shown a cross sectional view of the ball and socket apparatus 16 of FIG. 1.

The socket assembly 17, as indicated, comprises two mirror image sections having a central aperture 50 for accommodating a ball joint. Each section as 17A and 17B has a groove 51 along the inside of the socket wall. The groove is adapted and dimensioned to hold and contain an elastomeric split "O" ring. The interior chamber 50 is formed when two sections as 17A are secured together by means of "Allen" type set screws which engage and are held within the threaded apertures as 52 and 53 formed in the socket assemblies 17A and 17B, as more clearly depicted in FIG. 1. The socket sections 17A and 17B may be fabricated from aluminum or another suitable structurial material.

The ball assembly 15 is integral and is fabricated from a mixture of bronze and brass. The ball has a central aperture 54 to accommodate and permit the cable assembly 20 to couple via an aperture 53 in the ball assembly into which aperture a lens accommodating shaft as 14 of FIG. 1 is inserted and rigidly held. The fiber optic or power cable 20 is thus directed, as shown (dashed) throughout the socket aperture via the aperture 54 in the ball 15 and thence to the shaft 14, which may contain a lens assembly for further focusing the light rays emanating from cable 20. The shaft 14 has a threaded end which engages with a corresponding thread in the conical section 12 to permit the easy removing of the conical section 12.

Thus, the ball assembly 15 is retained within the recess or aperture 50 formed when the two socket sections are placed in contact and secured together by means of the set screws. The "O" ring is shown in FIGS. 3A and 3B. The "O" ring 60 is placed and retained in each groove 51 of the socket sections 17A and 17B. Once the socket sections are placed and secured about the ball section 15, the "O" ring 60, having a beveled edge forms a continuous surface for engaging and contacting the surface of the ball 15. The "O" ring 60 as indicated, is split as shown in FIG. 3B into a first section 60A and a second section 60B for insertion into the grooves as 51 associated with the socket sections 17A and 17B.

The "O" ring is pushed into contact with the surface of the ball 15 upon the tightening of the set screws. The ring assures that contact tension is impressed about the periphery of the ball 15 restraining movement of the same once adjusted to a desired position by tightening the set screws. The frictional forces impressed upon the ball by the "O" ring and socket assembly assure it is rigidly held with relatively constant tension at any position of adjustment.

Typically, the ball assembly 15 defines a diameter of about two inches, while the central socket aperture is slightly larger. (2 inches plus 0.005 inches). This increased diameter of the socket allows for all motion as shown in FIG. 4, for example. The tightening of the screws causes the "O" ring to firmly abut the ball assembly 15 and impress a force thereon about the periphery of the ball to secure it firmly within the recess formed by the socket parts. The "O" ring 60 has a beveled edge closest to the lens shaft 14. The bevel prevents the edge of the ball assembly 15 from catching on the surface of the "O" ring as one part of the an is turned below the "O" ring during a extreme adjustment angle as shown in FIG. 4, for example. When the cone 12 is supported as shown in FIG. 1, relatively horizontally or upright, the "O" ring 60 contacts the ball relatively in the center or about the major diameter thereof. As also can be verified from FIG. 4, the diameter of the shaft 14 limits the extreme position of the cone 12 by contacting with the edge of the socket. This prevents undue flexing or bending of the light transmitting cable assembly 20.

For the assembly, one can obtain, in excess of 130° range of movement of the ball, which movement is further complemented by the hinged joint and rotatable movement of the supporting assembly as 32 and 33 of FIG. 1.

In utilizing the apparatus shown, the surgeon or his associates would disengage the reflector conical section 12 and sterilize the same prior to surgery. The sterilized section 12 would then be secured to the shaft assembly 14, the set screws are preadjusted to provide constant tension and the surgeon can now adjust the light apparatus by means of the cone 12 to any position desired. The adjustment as facilitated is maintained by tightening of the set screws 18 and held securely by causing the elastomeric "O" ring to press or abut against the ball assembly 15. Since, the entire assembly is sterilized, further adjustment can be made under sterile conditions.

Due to the fact that the cable 20 may be an optical cable, it can therefore transmit light emanating from a remote source and eliminates the need for an incandescent bulb.

Thus, one can readily ascertain from the description above, that there is provided a unique ball and socket joint employing a split socket assembly with an "O" ring accommodating channel. The "O" ring assures constant tension on the ball firmly securing the same within the socket. This feature can be employed in a plurality of circumstances and can, for example, be used to support a surgical microscope to enable adjustment of the same as seen in FIG. 5.

Thus, in FIG. 5 a ball assembly is shown secured within a split socket housing 72. The housing 72 has a channel accommodating an "O" ring 75 with a shaft 76 coupled to a surgical microscope 73. While the ball section 70 may have a cable accommodating aperture as previously shown, it can also be solid and a cable 76 may be directed to the microscope from another source; the main feature being the adjustability aspects of the ball and socket assembly.

Other modifications and uses will become apparent to those skilled in the art upon reading this specification and all such embodiments are deemed to be encompassed within the spirit and scope of the claims appended hereto.

I claim:

1. In a ball and socket joint, said socket having an internal groove about the inner periphery of a ball accommodating aperture, friction means in said socket for holding said ball in any desired position of movement of said ball, said means including a elastomeric beveled "O" ring having a continuous engaging surface which is seated and positioned in said groove to coact with and engage the central periphery of said ball for exerting a frictional force on the peripheral surface of said ball for maintaining said ball in all positions of adjustment, with said beveled edge of said "O" ring permitting said full range of adjustable positions; while providing a full 360° rotational motion.

2. A ball and socket joint as defined in claim 1 wherein said socket comprises two halves clamped together, said socket having a circumferential groove in which said beveled "O" ring is adapted to be positioned.

3. A ball and socket joint as defined in claim 2 wherein said ball and socket both have centrally positioned openings for accommodating a light carrier cable positioned within said openings.

* * * * *